United States Patent
Ginzboorg et al.

(10) Patent No.: US 6,349,088 B1
(45) Date of Patent: Feb. 19, 2002

(54) TRAFFIC CONTROL IN A COMMUNICATION SYSTEM

(75) Inventors: Philip Ginzboorg; Tom Helenius, both of Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,366

(22) PCT Filed: Nov. 8, 1996

(86) PCT No.: PCT/FI96/00607

§ 371 Date: May 7, 1998

§ 102(e) Date: May 7, 1998

(87) PCT Pub. No.: WO97/17784

PCT Pub. Date: May 15, 1997

(30) Foreign Application Priority Data

Nov. 9, 1995 (FI) .................................. 955407

(51) Int. Cl.⁷ .............................................. M04J 1/16
(52) U.S. Cl. ...................................... 370/230; 370/252
(58) Field of Search .......................... 370/252, 229, 370/230, 231–235, 253, 395

(56) References Cited

U.S. PATENT DOCUMENTS

| | | | |
|---|---|---|---|
| 5,274,625 A | * 12/1993 | Derby et al. ............... | 370/352 |
| 5,311,513 A | * 5/1994 | Ahmadi et al. ............ | 370/235 |
| 5,315,586 A | 5/1994 | Charvillat | |
| 5,359,593 A | * 10/1994 | Derby et al. ............... | 370/468 |
| 5,381,407 A | 1/1995 | Chao | |
| 5,511,076 A | * 4/1996 | Ramakrishnan et al. .... | 370/232 |
| 5,515,359 A | * 5/1996 | Zheng ....................... | 370/231 |
| 5,596,576 A | * 1/1997 | Milito ........................ | 370/468 |
| 5,666,353 A | * 9/1997 | Klausmeier et al. ........ | 370/230 |
| 5,668,801 A | * 9/1997 | Grunenfelder ............... | 370/253 |
| 5,790,521 A | * 8/1998 | Lee et al. .................... | 370/230 |

FOREIGN PATENT DOCUMENTS

| | | |
|---|---|---|
| EP | 0 658 999 A2 | 6/1995 |
| EP | 0 666 701 A1 | 8/1995 |
| EP | 0 687 120 A1 | 12/1995 |

OTHER PUBLICATIONS

Onvural, Raif O., *Asynchronous Transfer Mode Networks: Performance Issues*, "Leaky Bucket", Chapter 4.5.1, 1994.

* cited by examiner

*Primary Examiner*—Chau Nguyen
*Assistant Examiner*—Chiho Andrew Lee
(74) *Attorney, Agent, or Firm*—Altera Law Group, LLC

(57) ABSTRACT

The invention relates to a method for traffic control in a communication system transferring traffic units. The invention includes maintaining a continuously changing quantity determining whether an individual traffic unit can be forwarded, changing the value of the quantity so that a traffic density lower than a specific predetermined value changes the value of the quantity in a first direction, but no more than up to a predetermined first limit, and a traffic density higher than said predetermined value changes the value in a second direction. Further, the inventing relates to rejecting traffic units as the value of the quantity in said second direction reaches a specific predetermined second limit. In order to save the network bandwidth, the value of the quantity is also changed for the rejected traffic units in the second direction, but no more than up to a specific predetermined third limit, and when the value of the quantity is between the second and the third limit, it must again alter in said first direction up to at least the second limit before traffic units are accepted.

6 Claims, 8 Drawing Sheets

TRAFFIC CONTROL IN A COMMUNICATION SYSTEM

FIELD OF THE INVENTION

The present invention relates to a method for traffic control in a communication system transferring traffic units, the method comprising the steps of maintaining a continuously changing quantity for the traffic units, the value of the quantity at any one time determining whether an individual traffic unit can be accepted to be forwarded; changing, at accepted traffic units, the value of said quantity so that a traffic density lower than a specific predetermined value changes the value of the quantity in a first direction but no more than up to a predetermined first limit, and a traffic density higher than said predetermined value changes the value in a second direction; and beginning rejection of traffic units as the value of the quantity in said second direction reaches a specific predetermined second limit. The invention further relates to traffic filters for limiting traffic in a communication system forwarding traffic units, such as cells.

The solution according to the invention may be utilized for example in measuring cell traffic in an ATM network, but it is applicable in connection with other kind of traffic as well, for example in call transfer, as will be disclosed below. Due to the many operational environments, the cells, packets, calls etc entities transferred in the system will below be referred to with a general term "traffic unit".

BACKGROUND OF THE INVENTION

Usually, at the connection establishment or at the connection set-up phase, the parameters to be complied are agreed upon. Typical connection parameters include traffic maximum rate and average rate. From the point of view of the network, it is not certain that the parameters agreed upon would automatically be complied on each connection. A reason for this is that it is difficult for a user to know accurately the nature of the traffic in advance. E.g., the average bit rate of a compressed video signal may be very difficult to determine in advance. The subscriber equipment may also be faulty or the users may, quite on purpose, to underestimate their bandwidth requirements to keep the costs lower. Due to e.g. the above reasons, it must be ensured at the network-subscriber interface that the traffic sources stay within the limits agreed upon at the connection set-up phase.

Various kinds of mechanisms have been developed for traffic source policing, most of which police the average and maximum rates of the traffic source and the duration of active periods. One of such mechanisms is a so-called "leaky bucket" principle. The principle of leaky bucket is disclosed e.g. in the reference Raif O. Onvural: Asynchronous Transfer Mode Networks, Performance Issues, Arctech House Inc., 1994 (ISBN 0-89006-662-0), Chapter 4.5.1. The leaky bucket principle is used e.g. by the GCRA algorithm (Generic Cell Rate Algorithm) of an ATM (Asynchronous Transfer Mode) network UPC (Usage Parameter Control) function, the GCRA being used to police that cell traffic is in accordance with the traffic agreement of the connection in question.

The aforementioned prior art mechanisms are not, however, the best possible e.g. in such applications in which a specific (smaller) information unit, such as a cell, is critical from the point of view of correctly receiving a larger information unit. In such a case, losing a smaller information unit e.g. an AAL (=ATM Adaptation Layer) frame might lead to having to retransmit a larger amount of information. To take an example, if the data stream has been divided into "segments" that are compressed and encrypted so that each encrypted data unit is hundreds of cells long, the loss of one or more cells may lead to the receiver being incapable of reconstructing the data unit, and all the cells of the unit in question have to be retransmitted.

Utilizing prior art policing mechanisms in connection with embodiments of the type described above results in wasting the network resources. This is because the known mechanisms limit traffic so that the accepted traffic is always in accordance with the traffic agreement (i.e. only traffic units violating the traffic agreement are rejected), whereby rejecting a specific portion easily results in that also previously accepted traffic units have to be retransmitted.

BRIEF DESCRIPTION OF THE INVENTION

It is an object of the present invention to provide, in as simple as possible a manner, an improvement on the drawback set forth in the above. This object is achieved by the method according to the invention, which is characterized in that the value of the quantity is also changed at rejected traffic units in said second direction, but no more than up to a specific predetermined third limit, and that when the value of the quantity is between the second and the third limit, it must again alter in said first direction up to at least said second limit before traffic units are accepted. The second embodiment of the invention relates to a method for traffic control in a communication system forwarding traffic units, the method comprising the steps of calculating a Theoretical Arrival Time (TAT) for the next traffic unit to arrive, whereby the actual arrival time of the incoming traffic unit determines whether an individual traffic unit can be forwarded; changing, by means of accepted traffic units, the theoretical arrival time so that a traffic density lower than a specific predetermined value changes the theoretical arrival time less than a traffic density higher than said predetermined value; and rejecting a traffic unit arriving before the TAT to the extent of a specific predetermined instant of time (TAT-L). This invention is characterized in that also rejected traffic units are utilized in changing the theoretical arrival time, but no more than up to a specific predetermined limit (time+H).

The invention also relates to a filter for limiting traffic in a communication system forwarding traffic units, such as cells, the filter comprising means for maintaining the continuously changing quantity whose value at any one time determines whether an individual traffic unit can be accepted to be forwarded; means for changing the value of said quantity at accepted traffic units so that a traffic density lower than a specific predetermined value changes the value of the quantity in a first direction but no more than up to a predetermined first limit, and a traffic density higher than said predetermined value changes the value in a second direction; and means for rejecting traffic units as the value of the quantity reaches and exceeds in said second direction a specific predetermined second limit. The invention is characterized in that it further comprises means for changing the value of the quantity at rejected traffic units in said second direction but no more than up to a specific predetermined third limit.

The invention further relates to a filter for limiting traffic in a communication system forwarding traffic units, such as cells, the filter comprising calculating means for calculating the theoretical arrival time for the next traffic unit to arrive; comparing means for comparing the actual arrival time of the arriving traffic unit to the calculated theoretical arrival time and the time dependent thereupon; and decision-making means responsive to the comparing means for determining whether an individual traffic unit can be accepted to be forwarded. The invention is characterized in that the calculating means are adapted to change the theoretical arrival time also at rejected traffic units but no more than up to a specific predetermined limit.

BRIEF DESCRIPTION OF THE DRAWINGS

The idea of the invention is to modify the prior art policing mechanisms into low-pass direction so that they are able to filter all traffic from a traffic source not complying with the parameters agreed.

The solution according to the invention provides, in a simple manner, a policing mechanism by means of which it is possible to save network bandwidth in connection with the types of traffic sources described above.

In the following, the invention and its preferred embodiments will be described in greater detail with reference to the examples in the accompanying drawings, in which.

DETAILED DESCRIPTION OF THE INVENTION

Figure 1:
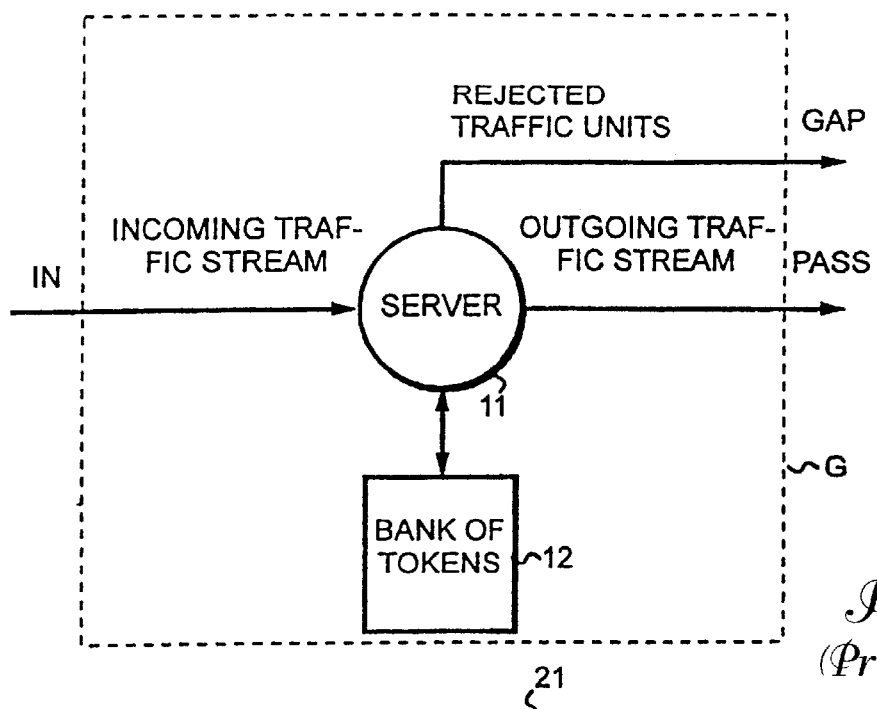
FIG. 1 illustrates the prior art Token Bank principle.

As the present invention only requires minor modifications to prior art policing mechanisms, the prior art Token Bank principle will first be briefly discussed with reference to FIGS. 1 and 2.

For incoming traffic units, such as cells, there is arranged a bank or pool of tokens 12, to which tokens are added at a specific constant rate. The pool has a maximum size, and the tokens arriving in the pools when it is full will be wasted. Every arriving traffic unit must take a token from the pool before a server 11 forwarding traffic may forward it. If the pool is empty upon arrival of the traffic unit, the traffic unit in question will be rejected. The pool size determines the maximum limit for the burst size that can be forwarded. The pool of tokens is therefore in a way a resource which is created for the traffic stream, and which is reduced by the incoming traffic and increased, in turn, by time. The device could therefore be represented by a filter or a gapping gate G, the gate having one input denoted by the reference mark IN, and two outputs denoted by the reference marks PASS and GAP. The incoming traffic units are directed to the gapping gate input IN and the passed traffic units are forwarded from the output PASS. The gapping gate limits the frequency (frequency of occurrence) of the traffic units so that the amount of passed traffic within a time unit does not exceed the aforementioned gapping parameter U (traffic units per second). In case the amount of incoming traffic within a time unit exceeds the value U, the gapping gate directs some of the traffic units to the output GAP so that the rate of the output traffic from the port PASS is not higher than U.

Figure 2:
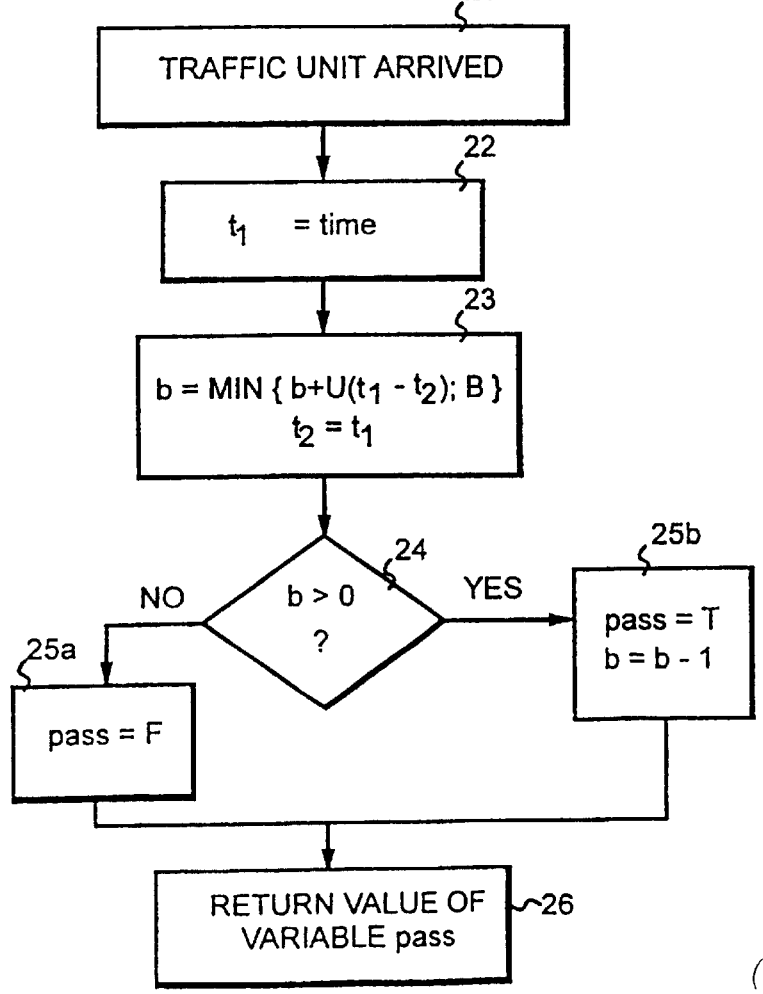
FIG. 2 is a flow chart illustration of the operation of a gapping gate (i.e. filter) according to FIG. 1.

FIG. 2 shows a flow chart of how a gapping gate based on the Token Bank principle operates. The following parameters are stored in the memory of the gapping gate:

time $t_2$ corresponding to the latest traffic unit arrived (which is initially the same as the current time $t_1$), the gate limit value U (fixed value). In case the amount of average incoming traffic is lower than U, no gapping takes place (in an ideal case). In case the amount of traffic offered exceeds the value in question, the policing mechanism rejects part of the traffic units.

pool size B (fixed value), and the pool counter value b, representing the number of "tokens" in the pool at any one time. Initially, the value of b may be e.g. zero, and the number of "tokens" may increase at a constant rate corresponding to the value limit U (as is apparent from the flow chart step 23). However, the pool size (the value of the counter) is only updated upon arrival of a traffic unit, and on the basis of the size a decision is made whether the traffic unit in question can be accepted.

Upon receiving a new traffic unit (step 21), the gapping gate stores the current time in a variable $t_1$ (step 22). Following this, the gapping gate updates the pool size i.e. calculates a value for the quantity $[U \times (t_1-t_2)+b]$, compares it to value B and selects, for the variable b, the lower of these values. In addition, the gapping gate updates the value of the variable $t_2$ (step 23). Then, the gapping gate examines whether the variable b has a value higher than zero (step 24). If that is the case, the variable pass will be given the value true (T) and the counter will be decremented (step 25a). In case the counter value b is not higher than zero, the variable pass will be given the value false (F) (step 25b). Finally (step 26), the value of the variable pass will be returned, which means that the gate makes either a pass or a gap decision (the former if pass=T, and the latter if pass=F).

According to the invention, the operation of the policing method described above is modified so that traffic may accumulate not only "allowances" of tokens but also debt which it has to pay off before traffic may be forwarded. In practise, then, this means that the number of tokens may also be negative, i.e. the size of the pool not only has a positive limit (B) but a negative limit as well, denoted by the reference mark −D. This limit is hence the minimum value of the pool counter.

Figure 3A:
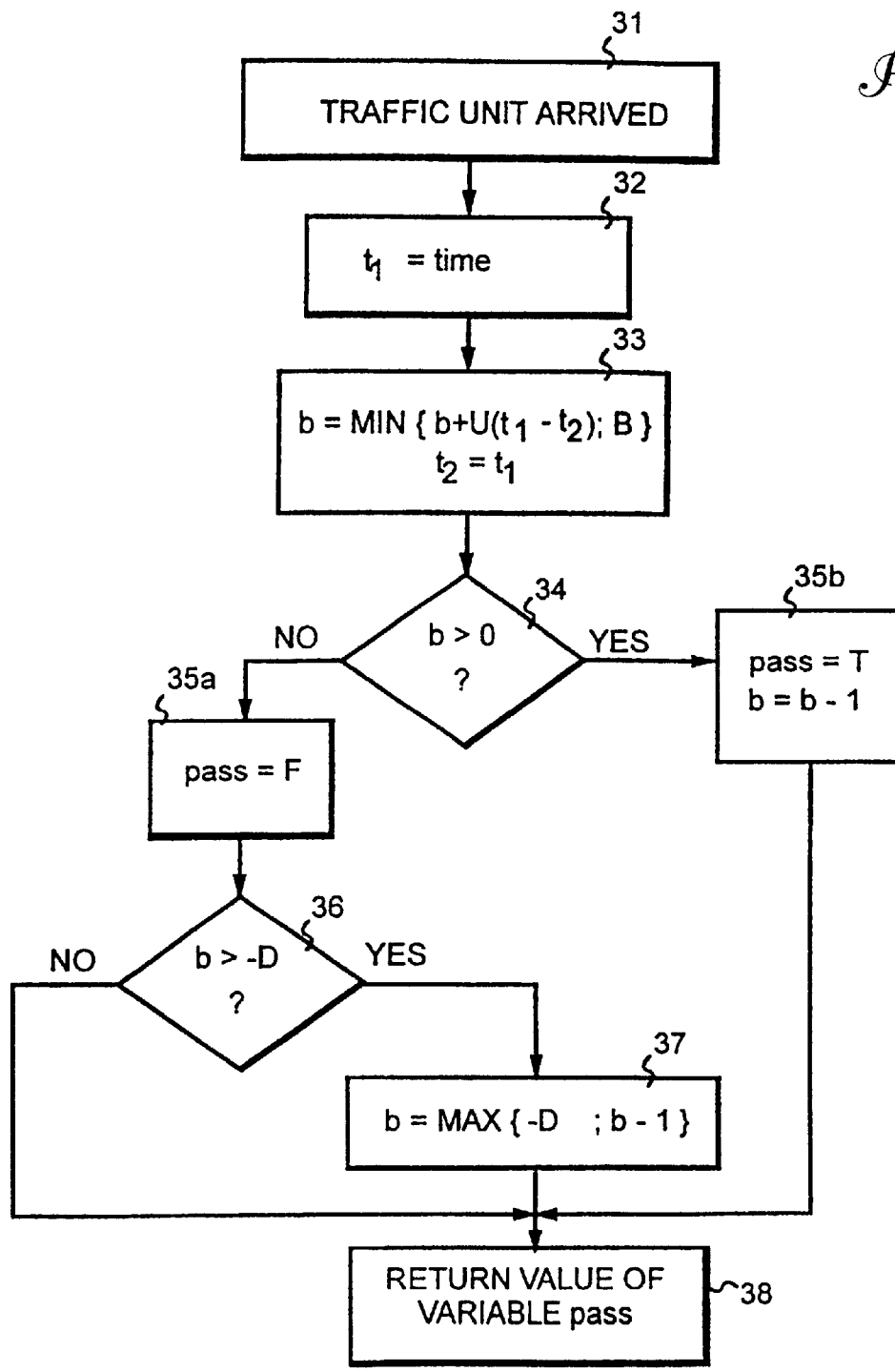
FIG. 3a is a flow chart illustrating the method of the invention in its first embodiment.

FIG. 3a illustrates the operation of the gapping gate according to the invention. Upon arrival of a new traffic unit (step 31), the gapping gate stores the current time in the variable $t_1$ (step 32). Following this, the gapping gate calculates a value for the quantity $[U \times (t_1-t_2)+b]$, compares it to the value B and selects, for the variable b, the lower of these values. In addition, the gapping gate updates the variable $t_2$ value (step 33). Then, the gapping gate examines whether the variable b (i.e. the pool size) has a value higher than zero (step 34). If that is the case, the variable pass will be given the value true (T) and the pool counter will be decremented (step 35b). In case the counter value b is not higher than zero, the variable pass will be given the value false (F) (step 35a). After this it is examined whether the counter value b is higher than the aforementioned predetermined minimum limit −D (step 36). If that is the case, the counter will be selected the higher of the values −D and b-1 (step 37). Then, the value of the variable pass will be returned at step 38. If it is detected at step 36 that the counter value does not exceed −D, the process proceeds directly to step 38, which is also reached directly from step 35b at which the variable pass obtained the value true (T).

Thus, the counter will, according to the invention, be decremented per each rejected traffic unit until the lower limit −D is reached (cf. step 37). In other words, by means of the rejected traffic units, the counter is updated even after the pool is empty, whereby the traffic stream runs into "debt". The traffic stream is in the "debt range" whenever $-D \leq b<0$ holds true for the value b of the counter. As also shown by FIG. 3a, the counter must indicate a value higher than zero in order for traffic units to be forwarded. A traffic stream with a rate much higher than the generation rate (U) of tokens is in constant "debt", which means that all or at least the majority of traffic units will be rejected. In other words, the gapping gate operates in a low-pass fashion.

Figure 3B:
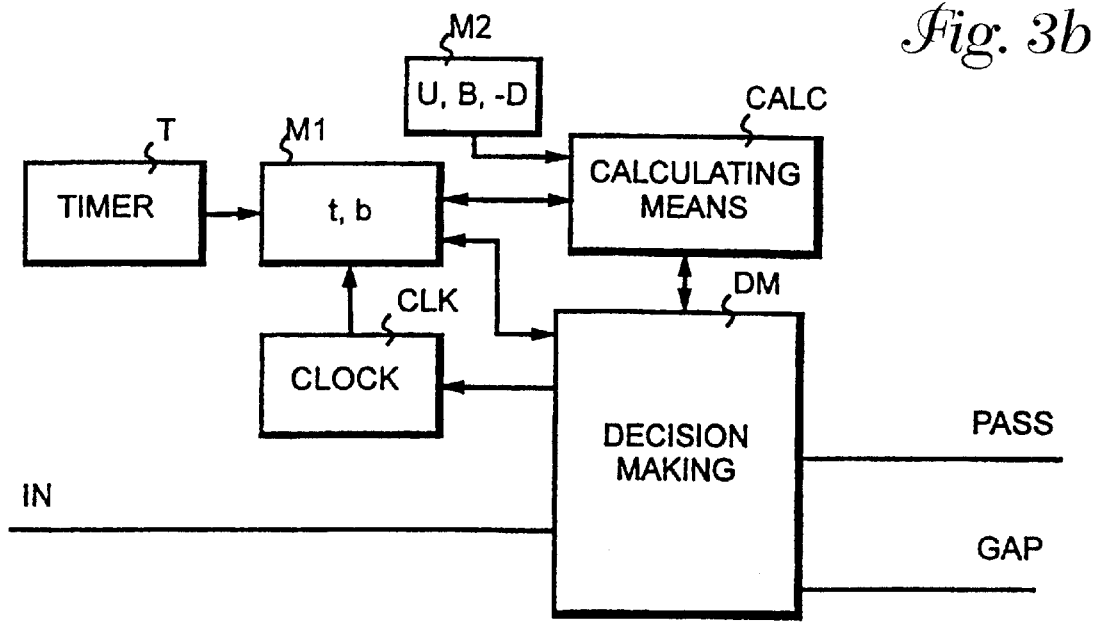
FIG. 3b is a block diagram illustration of a gapping gate operating as illustrated in FIG. 3a, FIG. 3c illustrates the operation of the gapping gate according to the invention.

FIG. 3b is a block diagram illustration of a gapping gate which may operate e.g. as that of FIG. 3a. The core of the gapping gate is comprised of a decision-making unit DM which includes an input IN and outputs PASS and GAP (cf. FIG. 4).

The gapping gate further comprises a memory M1 for the variables ($t_1$, $t_2$ and b) as well as a memory M2 for the constant parameters (U, B and –D). In addition to the memories, the gapping gate further comprises a calculating means CALC, a clock CLK and possibly a timing means T, which add "tokens" to the bucket (the timing means is not required, as is apparent from FIG. 3a). Upon arrival of a new traffic unit, the decision-making unit DM controls the clock CLK to store the current time in the memory M1, after which it controls the calculating means CALC to calculate the variable b value and to store it in the memory M1. Comparing the variable b then takes place within the decision-making unit. Depending on whether the variable b is higher than zero or higher than –D, the decision-making unit updates the correct variables as described above. Subsequently, the decision-making unit supplies a pulse either to the output PASS or the output GAP, depending on whether the traffic unit was passed or not.

Figure 3C:
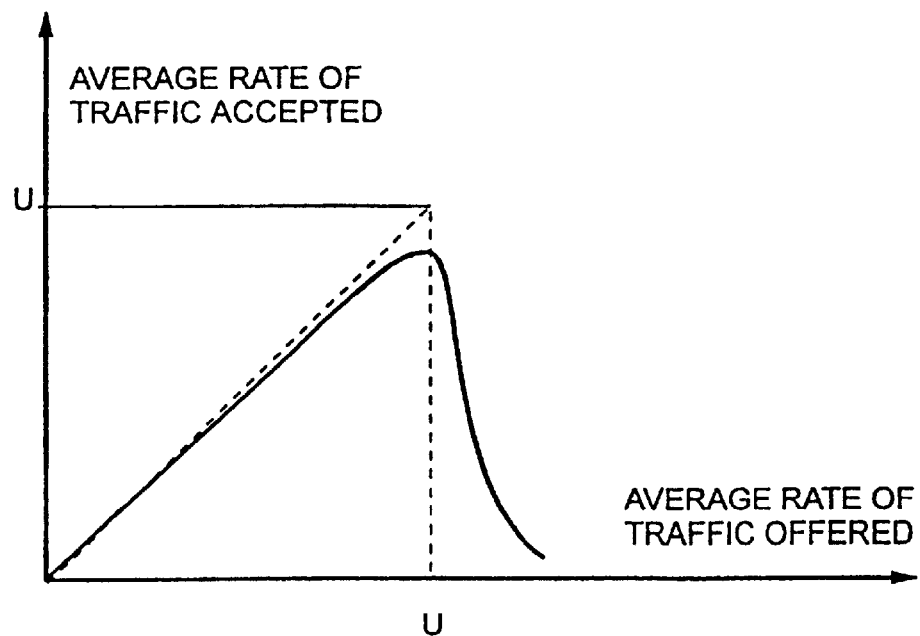

The operation of the call gapping method is illustrated by FIG. 3c. When the amount of average incoming traffic (depicted on the horizontal axis) is lower than the aforementioned maxim U, no gapping takes place (in an ideal case). When the average amount of the traffic offered exceeds the value in question, the gapping gate will reject all the traffic units (by directing them to the output GAP). The ideal case is represented by a broken line and a practical case by a solid line. In practise, the characteristic curve (solid line) representing the operation of the gapping gate is a smoothed approximation of the piecewise-linear characteristic curve (broken line) of the ideal case. The shape which the characteristic curve of the gapping gate will have also depends on the values given for the constant parameters D and B.

The leaky bucket or Token Bank principle can be illustrated in various ways depending on which variables are examined and which standpoint is chosen for examination. For example, it is not necessary to employ tokens but the resource employed may be time. Therefore, the following will describe the changes that the solution according to the invention will bring about in other similar prior art policing mechanisms.

Figure 4:
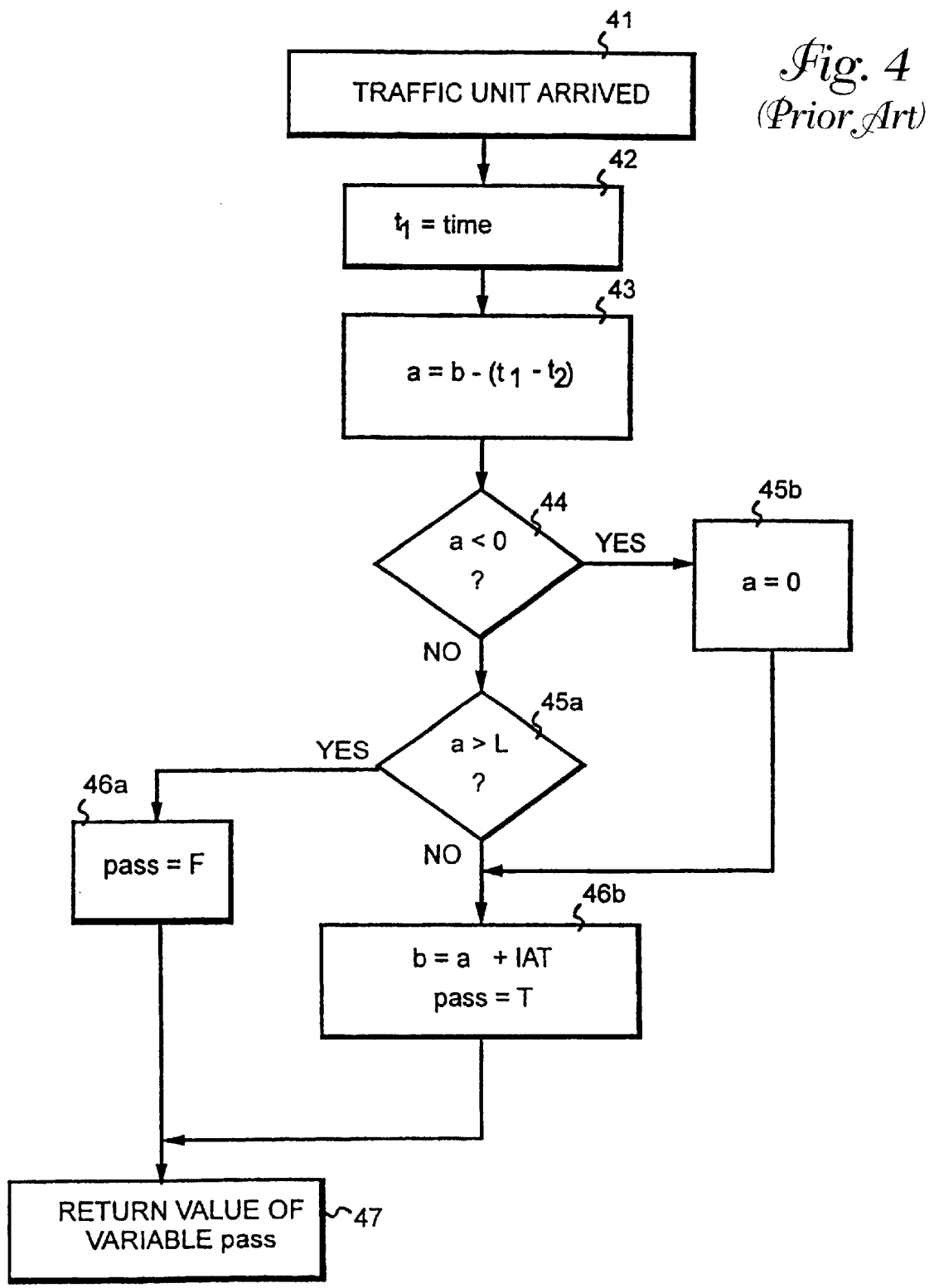
FIG. 4 is a flow chart illustrating the operation of a second prior art gapping gate.

FIG. 4 shows a flow chart of the continuous state leaky bucket mechanism which corresponds to the mechanism described in the ATM Forum's ATM User-Network Interface Specification, Version 3.1, p. 79). In this case, the gapping gate stores the following parameters in its memory:

the arrival time $t_2$ of the latest accepted traffic unit (initially the same as the current time $t_1$), IAT (Inter Arrival Time), which is the inverse value of the gapping gate limit value U and the (fixed) increment unit by which the counter is incremented at each accepted traffic unit, the counter value b, which increases as the traffic rate increases. The counter is decremented at a rate corresponding to the limit value U, but the decrementing is only realized upon arrival of a traffic unit, a, which is an auxiliary variable corresponding in principle to the counter value b, rejection limit L, corresponding to the counter value whose exceeding leads to rejection of traffic units. (The maximum value of the counter is L+IAT, and its minimum value, except for the short zeroing stage, is IAT.)

Upon arrival of a new traffic unit (step 41), the gapping gate stores the current time in the variable $t_1$ (step 42). Following this, the gapping gate gives the auxiliary variable the value $a=b-(t_1-t_2)$, i.e. the value which is obtained when the time that has lapsed from the latest passed traffic unit is subtracted from the current value of the counter (step 43). Then, the gapping gate examines whether the auxiliary variable b has a value lower than zero (step 44). If that is the case (i.e. only little traffic is present), the auxiliary variable will be set to zero (step 45b), after which the process proceeds to step 46b where the counter is given the value b=a+IAT, the variable pass is given the value true (T) and the arrival time of the preceding accepted traffic unit is updated. (After step 45b, the counter thus obtains the value IAT.)

If it is detected at step 44 that the auxiliary variable does not have a value lower than zero, it will be examined at step 45a whether the auxiliary variable has a value higher than a specific upper limit L (i.e. whether the "bucket" after all contains accumulated "allowance" to the extent that it can be used to forward the traffic unit in question). If the value of the auxiliary variable exceeds L, the interval has been too short (too high a frequency of occurrence) in relation to the accumulated "allowance", whereby the value false (F) is given to the variable pass at step 46a, from which the process proceeds to step 47 where the value of the variable pass will be returned.

If it is detected at step 45a that the value of the auxiliary variable a does not exceed L (i.e. the interval was not too short in relation to the accumulated "allowance"), the process proceeds to step 46b where the value of the counter and the arrival time of the preceding accepted traffic unit are updated, and the value true (T) is given to the variable pass.

In this embodiment, the contents of the bucket (the contents corresponding to the counter value b) leaks out at a constant rate U, and on the other hand the contents of the bucket are incremented at every accepted traffic unit. The counter should always indicate a value lower than or equal to L in order for traffic units to be accepted.

In the solution according to the invention, the embodiment described above is modified as shown by FIG. 5, i.e. by adding a step after step 46a (step 56a in FIG. 5). In addition, the variable $t_2$ in this case denotes the time of arrival of the preceding traffic unit. The operation is as follows, the reference numbers corresponding to the example of FIG. 4 except that they begin with the number five according to the number of the Figure. The auxiliary variable a is not required here at all.

Upon arrival of a new traffic unit (step 51), the gapping gate stores the current time in the variable $t_1$ (step 52). Following this, the gapping gate updates the counter to the value $b=b-(t_1-t_2)$, i.e. the value which is obtained when the time that has lapsed from the preceding traffic unit is subtracted from the current value of the counter. In addition, the variable $t_2$ is given the value $t_1$ (step 53). Then, the gapping gate examines whether the auxiliary variable b has a value lower than zero (step 54). If that is the case, the counter will be set to zero (step 55b), after which the process proceeds to step 56b where the counter is given the value b=b+IAT, and the variable pass is given the value true (T).

If it is detected at step 54 that the counter does not have a value lower than zero, it is examined at step 55a whether the counter has a value higher than a specific upper limit L. If the counter value is higher than L, the variable pass is given the value false (F) at step 56a. Following this, the process proceeds to step 57 where the value b+IAT is calculated, and the counter value is updated with the lower of b+IAT and H, where H is a predetermined counter upper limit which the counter is not allowed to exceed (note that 0<L<H). After the counter has been updated, the process proceeds further to step 58 where the value of the variable pass is returned.

If it is detected at step 55a that the value of the counter does not exceed L, the process proceeds to step 56b where the value of the counter and the arrival time of the preceding accepted traffic unit are updated as described above, and the value true (T) is given to the variable pass.

In this embodiment, too, updating the counter value per each rejected traffic unit is continued. In this case, the updating may only continue until reaching the counter upper limit H. Thus, the counter is updated even by rejected traffic units, whereby the traffic stream runs into "debt". The "debt range" is this case refers to the range where L<b≦H holds true for the counter reading b. As indicated by FIG. 5, the counter reading must drop back to at least the limit value L before traffic units may be forwarded.

Figure 5:
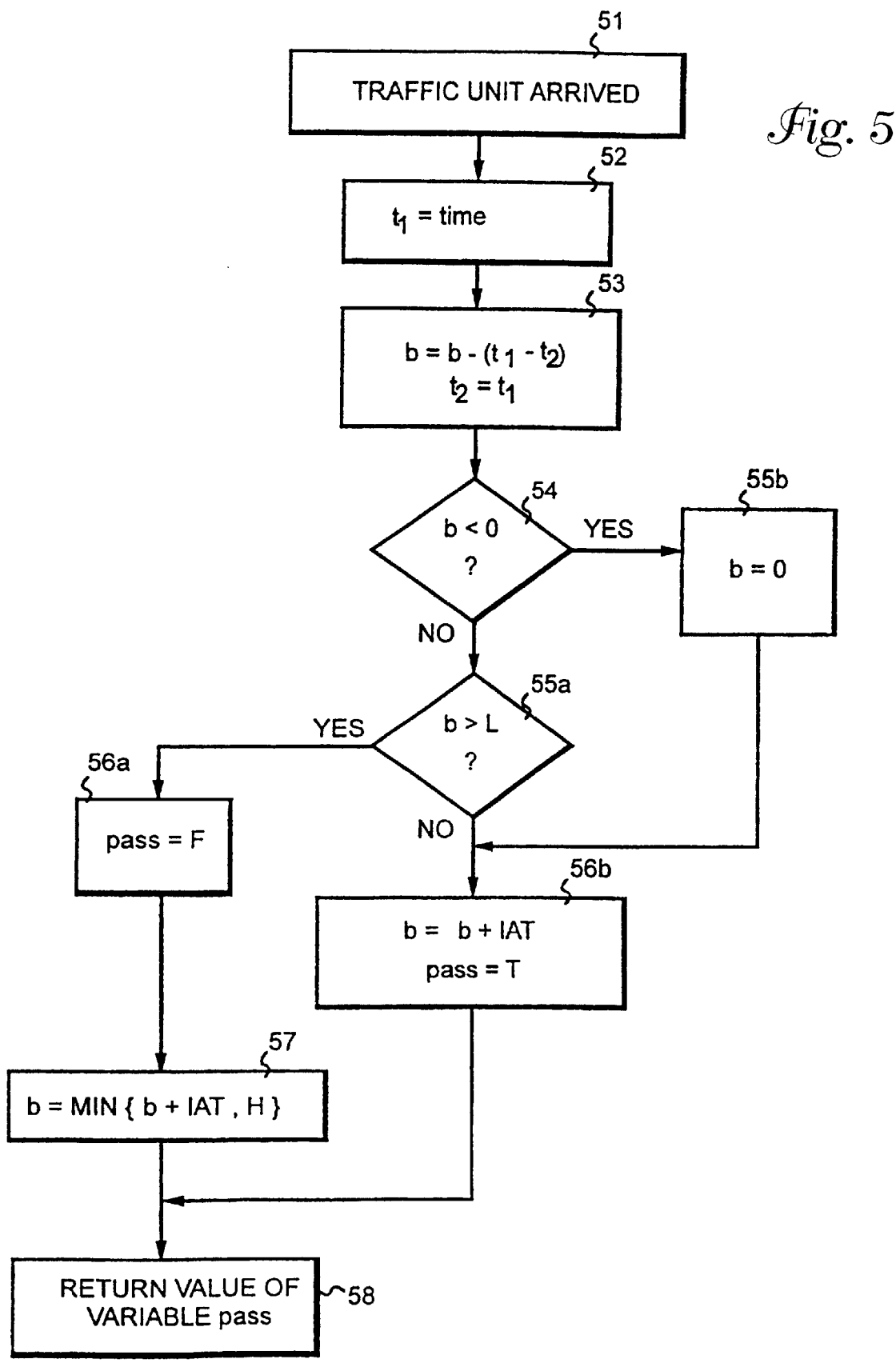
FIG. 5 is a flow chart illustrating the method of the invention as applied to the prior art gapping gate of FIG. 4.

The operation illustrated in FIG. 5 may also be implemented by an apparatus such as illustrated in FIG. 3b. In such as case, however, memory M2 stores different (constant) parameters (U, L and H).

Figure 6:
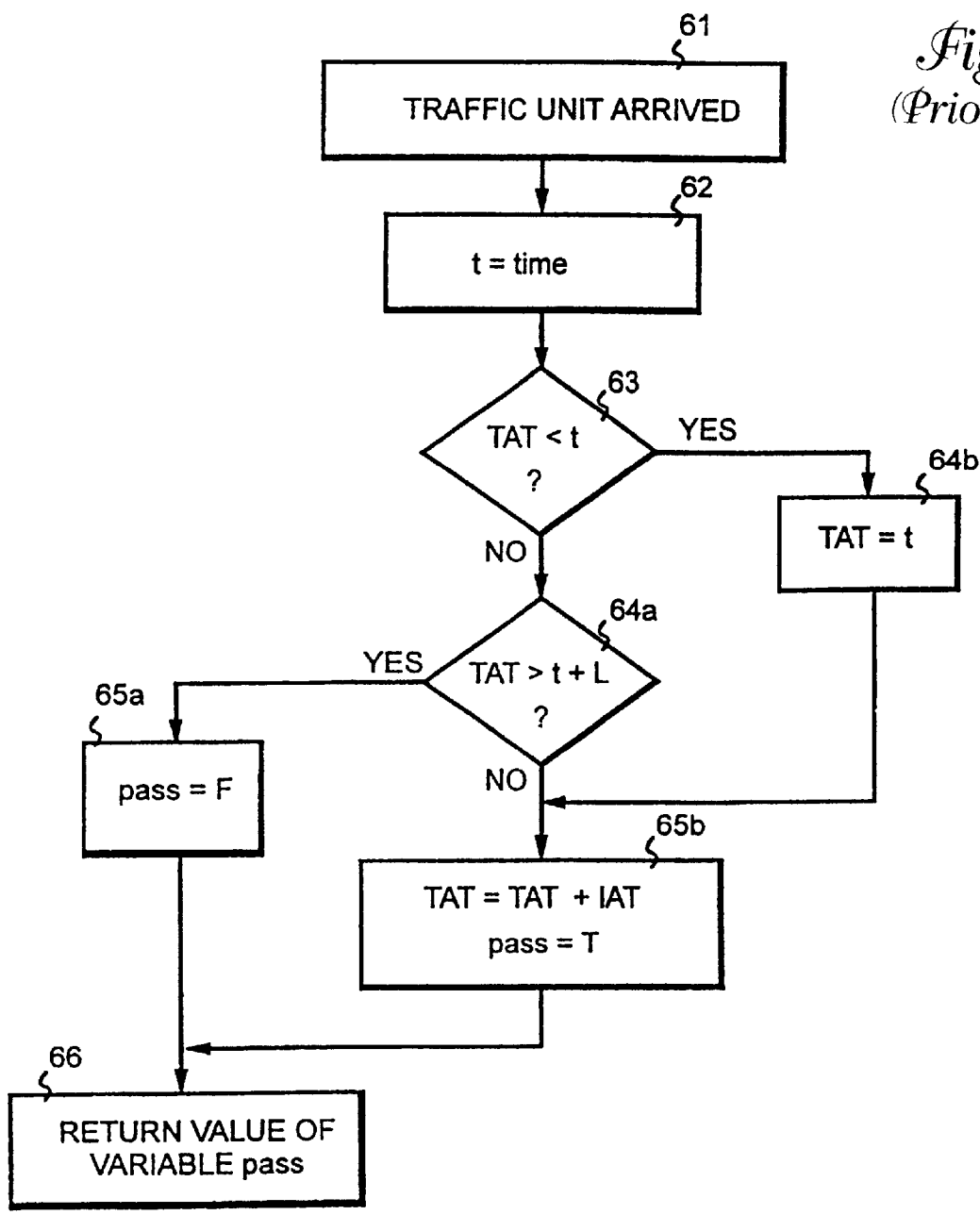
FIG. 6 is a flow chart illustrating the operation of a third prior art gapping gate.

In the above, a modification was made to the known algorithm which was illustrated in FIG. 4 and described in the aforementioned ATM Forum UNI (User Network Interface) specification. A similar modification may be incorporated in the Virtual Scheduling algorithm, described in the aforementioned specification as being equivalent to the continuous state leaky bucket mechanism set forth above. FIG. 6 is a flow chart illustration of the Virtual Scheduling mechanism which handles running clock time. In this case, the gapping gate stores the following parameters in its memory:

TAT (Theoretical Arrival Time) is the theoretical arrival time which is compared to the current time. Thus, TAT corresponds to the time when the next traffic is due if the intervals between traffic units (of traffic steam at rate U) were equal.

IAT (Inter Arrival Time), which represents the inverse value of the gapping gate limit value U and the incrementing unit by which the counter is incremented at every accepted traffic unit, and rejection limit L.

Upon arrival of a new traffic unit (step 61), the value of the variable t is updated to correspond to the current time (step 62). Following this, it is examined at step 63 whether TAT is lower than said time. If that is the case, the variable TAT is updated with the value t (step 64b), after which the process proceeds to step 65b where a new TAT is calculated by adding the constant IAT to the previous value. Additionally, the variable pass is given the value true (T).

If it is detected at step 63 that the value of the variable TAT is not lower than the time corresponding to the arrival time of the traffic unit, the process proceeds to step 64a where it is examined whether the value of TAT is higher than t+L (i.e. whether the traffic unit has after all arrived before the instant of time TAT-L). If that is the case, the variable pass will be given the value false (F) at step 65a. If that is not the case, the process in turn proceeds to step 65b where a new TAT is calculated by adding the constant IAT to the previous value. In addition, the variable pass is given the value true (T). From steps 65a and 65b, the process proceeds to the final step (step 66) where the value of the variable pass is returned.

In the mechanism described above, the calculated TAT hence corresponds to the counter value of the preceding examples, the value in question being indicative of the "pool size" at the arrival moment of each traffic unit. In this case, then, the "counter" has no upper limit (as time goes on). As can be seen, the methods above are similar to one another: the term (L/IAT) in a way corresponds to the pool size B and the term (H−L)/IAT in a way corresponds to D.

The modification into a low-pass filter according to the invention takes place as in the above by adding into the rejection branch an extra step 65c (FIG. 7a) where the value of the variable TAT is updated so that the updated value equals the lower of the values TAT+IAT and t+H. In this case, too, updating the variable TAT continues in the rejection branch in the same manner as in the acceptance branch (at step 75b), but t+H is the highest value accepted for TAT. The "debt range" in this example is created by shifting, in case of heavy traffic, the TAT further away rejected-traffic-unit by rejected-traffic-unit, but not further away than distance H from the current time instead of not carrying out the shift at all for rejected traffic units.

Figure 7A:
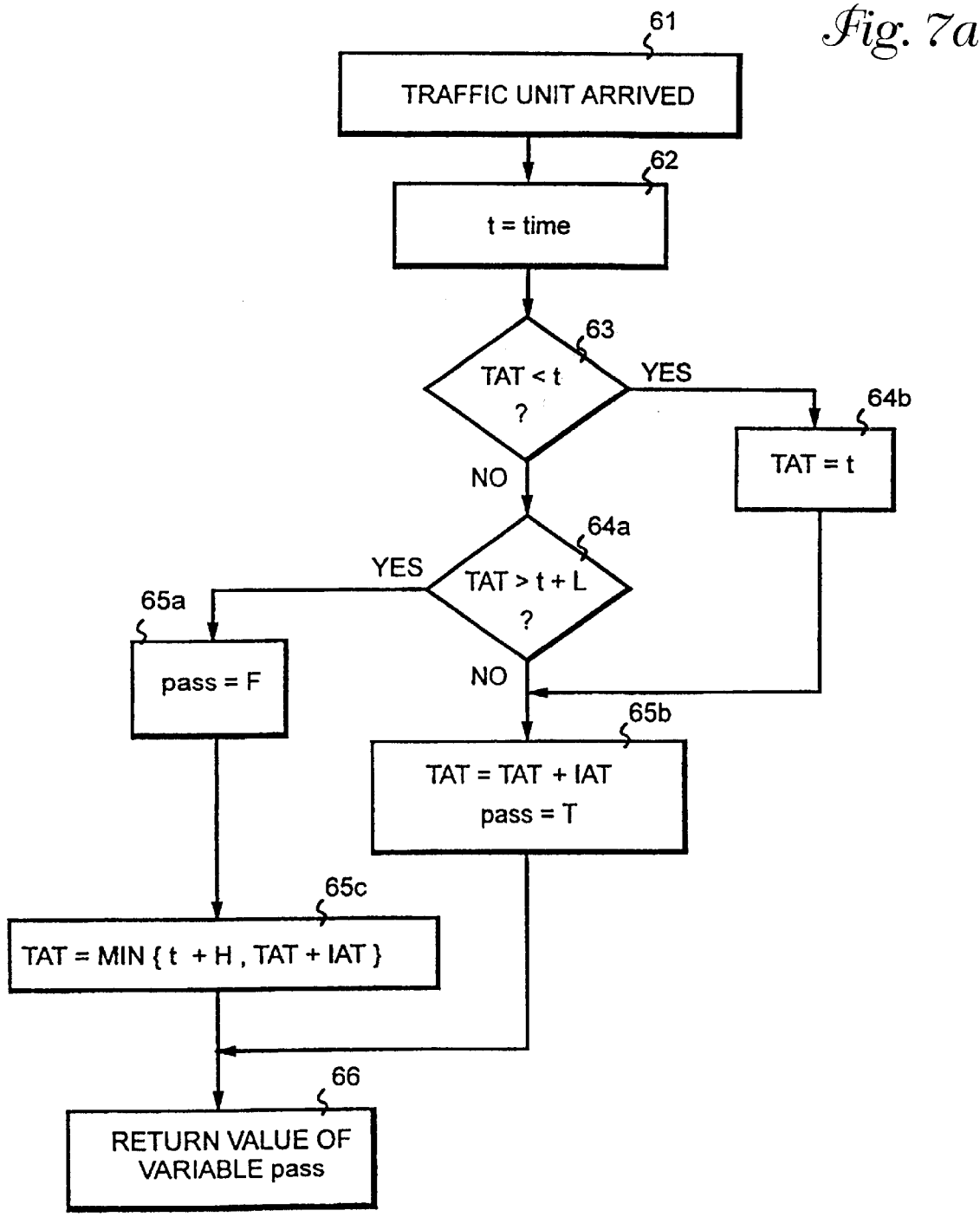
FIG. 7a shows a flow chart illustrating the method of the invention as applied to a gapping gate operating according to FIG. 6.

In the examples according to FIGS. 6 and 7a, the theoretical arrival time TAT is the quantity which is varied according to traffic density. A traffic density lower than the limit value (U) causes a relatively smaller increase in the TAT value than does a traffic density higher than the limit value.

Figure 7B:
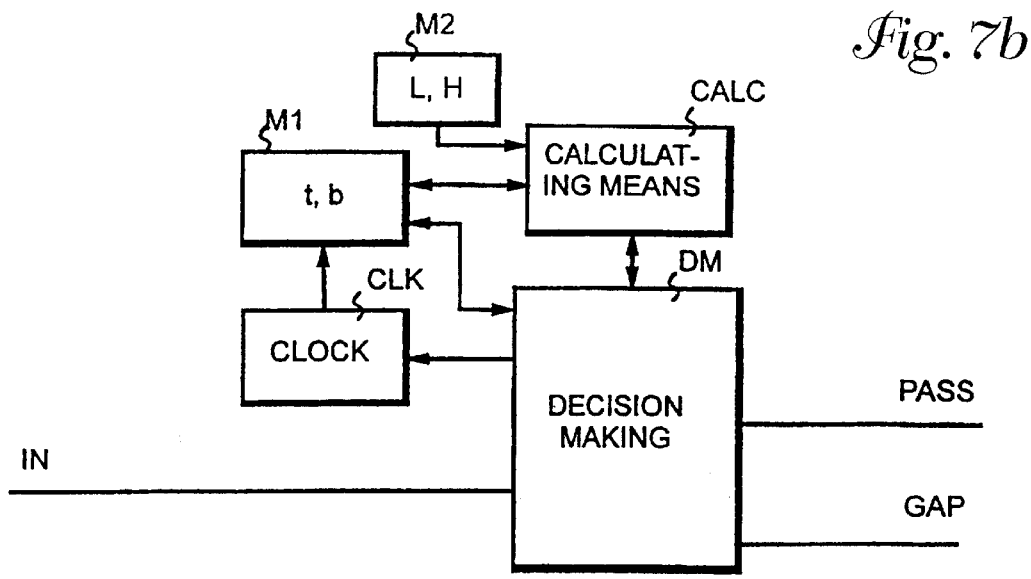
FIG. 7b is a block diagram illustration of a gapping gate operating as in FIG. 7a, and FIG. 8 illustrates an alternative way of implementing the gapping gate according to the invention.

The operation illustrated in FIG. 7a may also be implemented by an apparatus such as illustrated in FIG. 7b, the apparatus substantially corresponding to the one in FIG. 3b. Upon arrival of a new traffic unit, the decision-making unit DM controls the clock CLK to store the current time in the memory M1, after which it compares the values of the variables t and TAT (and if necessary the values of the variables t+L and TAT) to each other. Following this, the DM updates in accordance with FIG. 7a a new value for the theoretical arrival time, and supplies a pulse to either the output PASS or the output GAP depending on whether the traffic unit was accepted or not.

How large a "debt range" to choose depends on the characteristics desired for the gapping gate. The larger the "debt range" (i.e. the higher is D or H) the larger the debt for the traffic stream and the smaller number of traffic units will be accepted. This is indicated by FIG. 3c: the larger the "debt range" the steeper is the transition at the limit value U in the characteristics curve of the gate. On the other hand, the larger the "debt range" the longer it takes before the gate responds to a abrupt change in the traffic rate when that change is from a very high to a less than U rate. For example, if U=10 tokens per second, D=20 tokens and r=100 cells per second, after which r suddenly drops to r=5 cells per second, it takes 4 seconds for the gate to be out of the 20 token "debt". Only after this can the gate accept incoming traffic units. It is preferred that the limits (L, −D, H) and the distances between them be integers. A "rule a thumb" is that the relation (taken from either direction) between the size of the debt range and the size of the pool should be an integer. An advantageous special case is such where the debt range has a size equal to the pool size.

Figure 8:
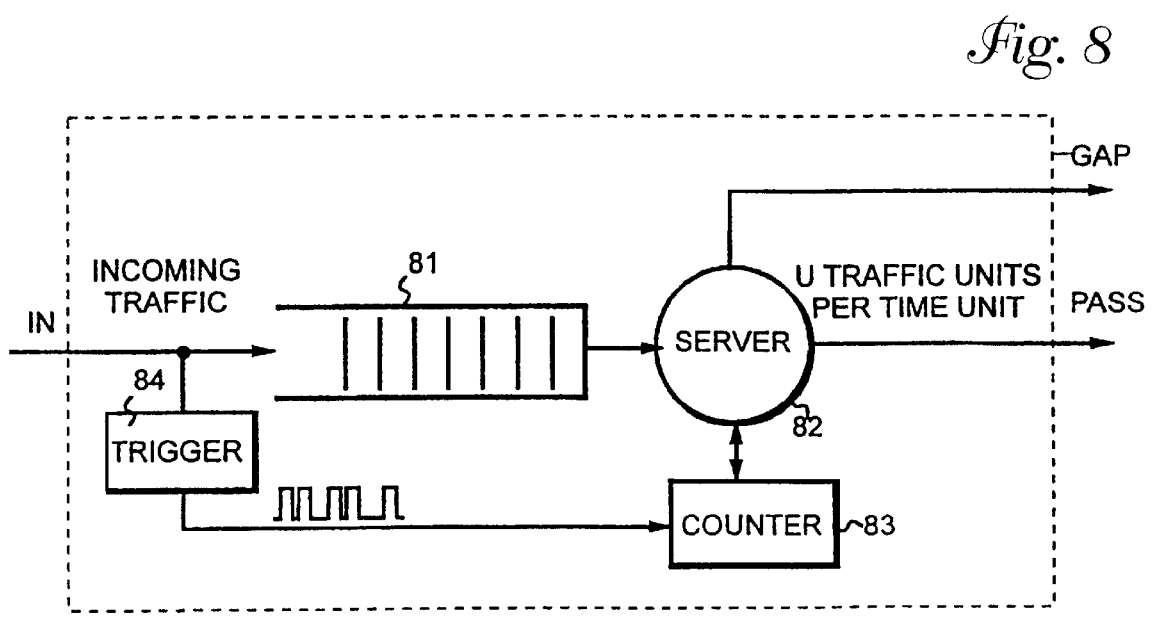

The method of the invention can also be implemented by e.g. a buffer served according to a FIFO principle (First In, First Out). Such an implementation is illustrated in FIG. 8. The traffic units, such as cells, are stored in a buffer 81 in a queue in the order of their arrival. When the queue is not empty, the traffic rates are read out from the head of the buffer at the rate U (traffic units per second). If the average rate of arrival is higher than U, the number of traffic units in the queue will increase. The traffic units that arrive when the queue is full will be rejected.

The traffic stream may be applied to e.g a trigger block 84 which generates a pulse per each incoming traffic unit. The buffer is provided with a counter 83 which obtains information corresponding to the traffic rate from the trigger block and by means of the pulses continuously calculates the free space in the buffer. Every traffic unit entering the queue decrements the counter and every traffic unit read out from the queue by the server 82 increments the counter. In case the queue is full, the rejected traffic units decrement the counter reading up to the limit −D (where D is a positive integer). If the counter has a value lower than zero, no traffic units will be read out from the buffer but the value of the counter increments at the rate U.

The parameter values used in the method of the invention are chosen on the basis of the traffic source type. (If the type is unknown, it will be given a default type.) Let us assume that the rate r of the traffic source is constant and corresponds exactly to the limit value U. This means that the pool size remains unchanged, for example it is zero. If the rate of the source changes to be higher than U for a short while and then drops back to U, the traffic stream is in constant debt for as long as a similar change takes place in the opposite direction. In cases of constant rate traffic sources, it is therefore advantageous to give the pool a positive initial size and to set the limit value U slightly larger, for example one percentage unit larger than the rate requested by the source at the connection set-up stage.

The filter (gapping gate) according to the invention may also be used together with a conventional filter; in a normal traffic situation a conventional filter is used, but in situations of overload a switch is made to employ the low-pass filter of the invention.

The filter may also be used so that the cells to be forwarded are designated according to their priority to e.g. two categories. This may be done with the aid of a CLP bit (Cell Loss Priority), for example. Only low priority cells are filtered whereas higher priority cells are not filtered at all. Alternatively, the high priority cells may be considered transparent from the point of view of the filter, in other words they are not counted at all, whereby the high priority traffic has no influence on low priority traffic Although the invention is above described with reference to the examples of the accompanying drawings, it is obvious that the invention is not restricted thereto but may be modified within the scope of the inventive idea disclosed above and in the attached claims. For example, in the embodiment in which a new theoretical arrival time is continuously calculated, any other linearly increasing quantity may be used instead of time. For reasons of simplicity, however, the attached claims (claim 4) refer to time.

What is claimed is:

1. A method for traffic control in a communication system transferring traffic units, the method comprising:

maintaining a continuously changing quantity for the traffic units, the value of the quantity at any one time determining whether an individual traffic unit can be accepted to be forwarded, changing, for the accepted traffic units, the value of said quantity so that if a traffic density is lower than a specific predetermined value, a value of the quantity is changed in a first direction to a value which is lower than or equal to a predetermined first limit, and if said traffic density is higher than said predetermined value, the value of the quantity is changed in an opposite second direction, and beginning rejection of traffic units as the value of the quantity in said second direction reaches a specific predetermined second limit, wherein changing the value of the quantity due to rejected traffic units in said second direction, but no more than up to a specific predetermined third limit, and when the value of the quantity is between the second and the third limit, the value of the quantity must again be altered in said first direction up to at least said second limit before traffic units are accepted.

2. The method as claimed in claim 1, wherein the distance of the third limit from the second limit is chosen so that it equals an integer.

3. The method as claimed in claim 2, wherein a distance of the third limit from the second limit is chosen to be substantially equal to the distance of the first limit from the second limit.

4. A method for traffic control in a communication system forwarding traffic units, the method comprising:

calculating a theoretical arrival time for a next traffic unit to arrive, wherein an actual arrival time of an incoming traffic unit determines whether an individual traffic unit can be forwarded, changing, by means of accepted traffic units, the theoretical arrival time so that a traffic density lower than a specific predetermined value causes the theoretical arrival time to be changed by an amount smaller than an amount of change caused by a traffic density higher than said predetermined value, and rejecting a traffic unit arriving before the theoretical arrival time as determined by a specific predetermined time, utilizing the rejected traffic units in changing the theoretical arrival time, but not more than up to a specific predetermined limit.

5. A filter for limiting traffic in a communication system forwarding traffic units, the filter comprising:

means for maintaining the continuously changing quantity whose value at any one time determines whether an individual traffic unit can be accepted to be forwarded, means for changing the value of said quantity of accepted traffic units so that a traffic density lower than a specific predetermined value changes a value of the quantity in a first direction but not more than up to a predetermined first limit, and a traffic density higher than said predetermined value changes the value in a second direction, means for rejecting traffic units as the value of the quantity reaches and exceeds in said second direction a specific predetermined second limit, and means for changing the value of the quantity at rejected traffic units in said second direction but not more than up to a specific predetermined third limit.

6. A filter for limiting traffic in a communication system forwarding traffic units, the filter comprising:

calculating means for calculating the theoretical arrival time for a next traffic unit to arrive, comparing means for comparing an actual arrival time of the arriving traffic unit to the calculated theoretical arrival time, and decision-making means responsive to the comparing means for determining whether an individual traffic unit can be accepted to be forwarded, wherein the calculating means are arranged to change the theoretical arrival time due to rejected traffic units to a value which is lower than or equal to a specific predetermined limit.

* * * * *